US012692878B2

(12) United States Patent
Derhardt

(10) Patent No.: US 12,692,878 B2
(45) Date of Patent: Jul. 28, 2026

(54) GAS SUPPLY APPARATUS

(71) Applicant: Robert Bosch GmbH, Stuttgart (DE)

(72) Inventor: Steffen Derhardt, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/850,205

(22) PCT Filed: Feb. 8, 2023

(86) PCT No.: PCT/EP2023/053096
§ 371 (c)(1),
(2) Date: Sep. 24, 2024

(87) PCT Pub. No.: WO2023/179961
PCT Pub. Date: Sep. 28, 2023

(65) Prior Publication Data

US 2025/0215895 A1 Jul. 3, 2025

(30) Foreign Application Priority Data

Mar. 24, 2022 (DE) ..................... 10 2022 202 889.9

(51) Int. Cl.
*F04D 29/58* (2006.01)
*F04D 17/10* (2006.01)
*F04D 25/06* (2006.01)

(52) U.S. Cl.
CPC ......... *F04D 29/5826* (2013.01); *F04D 17/10* (2013.01); *F04D 25/0606* (2013.01);
(Continued)

(58) Field of Classification Search
None
See application file for complete search history.

(56) References Cited

U.S. PATENT DOCUMENTS 3,810,509 A * 5/1974 Kun .......................... F28F 3/02 29/890.039
4,531,357 A * 7/1985 Weber ..................... F02C 7/185 60/39.83
(Continued)

FOREIGN PATENT DOCUMENTS

CN 215719818 U 2/2022
CN 215762310 U 2/2022
(Continued)

OTHER PUBLICATIONS

Translation of International Search Report for Application No. PCT/EP2023/053096 dated May 16, 2023 (2 pages).

*Primary Examiner* — Juan G Flores
(74) *Attorney, Agent, or Firm* — Michael Best & Friedrich LLP

(57) ABSTRACT

A gas supply apparatus with a shaft, which is rotatably mounted about a rotational axis in a housing, and with a temperature-controlling device, which consists of a medium temperature control surrounding the shaft, which is combined with a gas temperature control. The temperature-controlling device comprises a temperature-controlling sleeve with a first temperature-controlling guide geometry, which opens radially outward and is designed for guiding the flow of a temperature-controlling medium, and, for temperature-controlling gas, a gas temperature-controlling ring, which is equipped with a second temperature-controlling guide geometry that opens radially outward, and which delimits the first temperature-controlling guide geometry inwardly and/or axially and is delimited radially outwardly by a housing body, wherein the gas temperature-controlling ring comprises a sleeve-like base body, which is combined
(Continued)

with a structural sheet metal that serves as the second radially outwardly opening temperature-controlling guide geometry.

10 Claims, 10 Drawing Sheets

(52) U.S. Cl.
CPC ....... *F04D 29/5806* (2013.01); *F04D 29/584* (2013.01); *F05D 2230/54* (2013.01)

(56) References Cited

U.S. PATENT DOCUMENTS

| | | | | |
|---|---|---|---|---|
| 10,621,541 | B2 * | 4/2020 | Andres | G06Q 10/08 |
| 2015/0184946 | A1 | 7/2015 | Barwig et al. | |

FOREIGN PATENT DOCUMENTS

| | | | |
|---|---|---|---|
| DE | 102014224774 | A1 | 2/2016 |
| DE | 102018201162 | A1 | 7/2019 |

* cited by examiner

GAS SUPPLY APPARATUS

BACKGROUND

The invention relates to a gas supply apparatus with a shaft rotatably mounted about a rotational axis in a housing and with a temperature-controlling device consisting of a medium temperature control that surrounds the shaft and is combined with a gas temperature control.

From the German disclosure DE 10 2018 201 162 A1, an air supply apparatus is known, which is configured as a turbo machine, in particular for a fuel cell system, with a compressor, a drive apparatus, and a shaft, wherein the compressor comprises an impeller arranged on the shaft, a compressor inlet, and a compressor outlet, wherein a working fluid is conveyable from the compressor inlet to the compressor outlet, wherein a drive cooling path for cooling the drive apparatus branches off at the compressor outlet. From the German publication DE 10 2014 224 774 A, a cooling unit of an air compressor is known, which contains a spiral housing, an impeller mounted on the spiral housing, and a motor driving the impeller and cools the motor and the bearings that support a rotary shaft of the motor using air at an outlet side of the impeller, wherein the cooling unit comprises the following: A plurality of coolant channels arranged along a radial direction in a motor housing coupled to the spiral housing and through which coolant flows; and a channel for cooled air configured between the coolant channels of the motor housing and through which air flows.

SUMMARY

The problem addressed by the invention is to improve, in a functional and/or manufacturing-related sense, a gas supply apparatus with a shaft rotatably mounted about a rotational axis in a housing and with a temperature-controlling device consisting of a medium temperature control that surrounds the shaft and is combined with a gas temperature control.

In the case of a gas supply apparatus with a shaft, which is rotatably mounted about a rotational axis in a housing, and with a temperature-controlling device consisting of a medium temperature control surrounding the shaft and combined with a gas temperature control, the problem is solved in that the temperature-controlling device comprises a temperature-controlling sleeve with a first temperature-controlling guide geometry, which opens radially outward and is designed for guiding the flow of a temperature-controlling medium, and, for temperature-controlling gas, a gas temperature-controlling ring, which is equipped with a second temperature-controlling guide geometry that opens radially outward, said ring delimiting the first temperature-controlling guide geometry inwardly and/or axially and being delimited radially outwardly by a housing body, wherein the gas temperature-controlling ring comprises a sleeve-like base body, which is combined with a structural sheet metal that serves as the second radially outwardly opening temperature-controlling guide geometry. For example, the first radially outwardly opening temperature-controlling guide geometry comprises temperature-controlling medium guide structures, for example temperature-controlling medium channels, through which a preferably liquid temperature-controlling medium flows. The first temperature-controlling guide geometry preferably delimits the temperature-controlling medium guide structures on the temperature-controlling sleeve radially inwardly and in the axial direction. Radially outwardly, the temperature-controlling medium guide structures are not delimited by the temperature-controlling sleeve. The delimitation of the temperature-controlling medium guide structures of the first radially outwardly opening temperature-controlling guide geometry is carried out at least in one axial portion by the gas temperature-controlling ring. According to an exemplary embodiment, the first radially-outwardly opening temperature-controlling guide geometry is delimited in an axial portion at an end of the temperature-controlling sleeve by the gas temperature-controlling ring. However, it is also possible that the first radially-outwardly opening temperature-controlling guide geometry of the temperature-controlling sleeve is delimited by the gas temperature-controlling ring over its entire axial dimension. The term “axial” refers to a rotational axis of the shaft. “Axial” means in the direction of, or parallel to, this rotational axis. Analogously, “radial” means transverse to this rotational axis. The gas temperature-controlling ring substantially has the shape of a circular ring disc with a rectangular cross-section. Radially inwardly, the gas temperature-controlling ring has substantially the shape of a straight circular-cylindrical barrel. With at least one axial portion of this straight circular-cylindrical barrel, the gas temperature-controlling ring delimits the first radially outwardly opening temperature-controlling guide geometry formed on the temperature-controlling sleeve. Alternatively or additionally, the gas temperature-controlling ring delimits the first temperature-controlling guide geometry of the temperature-controlling sleeve in an axial direction. That is to say, the gas temperature-controlling ring with an end face, for example, delimits an axially opening temperature-controlling medium channel provided on the temperature-controlling sleeve. At this end face and/or radially inside, temperature-controlled temperature-controlling medium flows along the gas temperature-controlling ring. Gas flows around the second radially-outwardly opening temperature-controlling guide geometry. The second radially outwardly opening temperature-controlling guide geometry is advantageously provided on the gas temperature-controlling ring by way of the structural sheet metal. Very different radially outwardly opening temperature-controlling guide geometries can be easily realized on the gas temperature-controlling ring by way of the structural sheet metal. The sleeve-like base body substantially has the design of a straight circular-cylindrical barrel. By this geometrically rather simple design, the sleeve-like base body can be manufactured inexpensively, for example by a machining manufacturing method. The sleeve-like base body can be manufactured inexpensively with or without a collar, for example by a turning process. The structural sheet metal is also inexpensively produced, for example from a metallic sheet metal material. The second radially outwardly opening temperature-controlling guide geometry is advantageously introduced into the sheet metal material, for example, by deep drawing. The structural sheet metal produced in this way can then be rounded before it is joined with the sleeve-like base body.

For example, the gas supply apparatus is a compressor, in particular an air compressor, which is used in a fuel cell system to provide compressed air. The compressor can comprise an impeller. However, the compressor can also comprise multiple impellers. Alternatively or additionally, the compressor can be equipped with at least one turbine wheel. In that case, the compressor is also referred to as a turbo-compressor or turbo-machine. The gas supply apparatus can only be powered by at least one turbine.

A preferred exemplary embodiment of the gas supply apparatus is characterized in that the gas supply apparatus comprises an electromotive drive that drives the shaft and is surrounded by medium temperature control. The electromotive drive of the gas supply apparatus preferably comprises an electromotive drive with a fixed stator in which a rotor is rotatably arranged. The temperature-controlling guide geometry provided by way of the temperature-controlling sleeve, in particular in conjunction with a housing body that surrounds the temperature-controlling sleeve radially outwardly, serves to provide cavities through which the temperature-controlling medium flows. The temperature-controlling device represents a heat exchanger comprising the temperature-controlling sleeve and the gas temperature-controlling ring with the sleeve-like base body and the structural sheet metal. The temperature-controlling sleeve constitutes an inner part. The gas temperature-controlling ring constitutes a central part. The housing body constitutes an outer part. The temperature-controlling device with the inner part, the central part, and the outer part is arranged in an annular space, which is radially delimited inwardly by the electromotive drive, in particular the stator of the electromotive drive, and which opens radially outwardly or is delimited by a housing or a mounted structure. For example, between the inner part and the central part, at least one temperature-controlling medium channel is formed, through which the temperature-controlling medium, for example a water-glycol mixture, flows. Between the central part and the outer part, a gas-guiding structure, for example comprising at least one gas channel, is formed, through which gas to be cooled flows. In order to seal off the two temperature-controlling guide geometries, seals such as O-rings are advantageously provided.

A further preferred exemplary embodiment of the gas supply apparatus is characterized in that the sleeve-like base body has the shape of a straight circular-cylindrical barrel. In this way, a desired fluid separation between the two temperature-controlling guide geometries can be realized by means of technically simple manufacturing means in order to enable a heat exchange between the temperature-controlling medium and the gas, and vice versa.

A further preferred exemplary embodiment of the gas supply apparatus is characterized in that the sleeve-like base body comprises a collar at one end. The collar delimits the second radially outwardly opening temperature-controlling guide geometry at an axial end of the sleeve-like base body. Moreover, the collar is advantageously equipped with a receptacle groove, which serves to receive a seal, in particular an O-ring, in order to enable a seal between the gas temperature-controlling ring and the housing body. In addition, the collar simplifies the assembly and/or positioning of the structural sheet metal.

A further preferred exemplary embodiment of the gas supply apparatus is characterized in that the structural sheet metal is connected to the sleeve-like base body in a material-locking and/or positive-locking manner. A stable bond between the structural sheet metal and the sleeve-like base body is thus easily created.

A further preferred exemplary embodiment of the gas supply apparatus is characterized in that, on a side facing away from the sleeve-like base body, the structural sheet metal comprises a gas-guiding surface with raised regions, which serve as the second radially-outwardly opening temperature-controlling guide geometry. On the gas-guiding surface, the raised regions serve as temperature-controlling guide elements along which the gas is guided for temperature control in operation of the gas supply apparatus. The second radially outwardly opening temperature-controlling guide geometry is radially delimited inwardly by the structural sheet metal in the installed state of the gas temperature-controlling ring. Radially outwardly, the radially-outwardly opening temperature-controlling guide geometry of the gas temperature-controlling ring is delimited by the housing body. In the axial direction, the temperature-controlling guide geometry is advantageously delimited by the collar at the end of the sleeve-like base body. The raised regions which serve as the temperature-controlling guide elements can have different geometries. These geometries include prisms with a quadrilateral base structure. Angles of the prisms can all be ninety degrees. However, the prisms can also have different angles. The prisms can have a triangular, pentagonal, or hexagonal base structure. The temperature-controlling guide elements can also be cylindrical in shape. The temperature-controlling guide elements can have an elliptical cross-section. A basic shape of the raised regions that serve as the temperature-controlling elements can have a cross section that changes over a height in a radial direction, for example as is the case with a cone. The raised regions can also be configured as spheres or semi-spheres. The temperature-controlling guide elements can have a symmetrical contour in cross-section. However, the temperature-controlling guide elements can also have an asymmetrical contour or other tapered contour in cross-section. For example, the temperature-controlling elements can have a drop-shaped cross-section. All basic shapes of the raised regions can be combined with a cross-section that changes in the radial direction, that is to say, in particular as is the case with a cone. The raised regions can be evenly arranged in the structural sheet metal. However, different distances between the individual raised regions can also be provided, as required. All raised regions can have the same height, starting from the gas-guiding surface. In a further embodiment, however, the raised regions can also have different heights. The individual geometric shapes as described above can be combined as desired in the structural sheet metal.

In a method for manufacturing a temperature-controlling device for a gas supply apparatus as described above, the aforementioned problem is solved in that a sheet metal material is reshaped in order to form the gas-guiding surface with the raised regions, which serve as the second radially-outwardly opening temperature-controlling guide geometry. The raised regions, which serve as the second radially outwardly opening temperature-controlling guide geometry, are particularly advantageously introduced into the sheet metal material by deep drawing.

A preferred exemplary embodiment of the method is characterized in that the reshaped sheet metal material is bent and merged at two ends in order to create a structural sheet metal sleeve that is connected to the sleeve-like base body in order to realize the gas temperature-controlling ring, which is mounted on the temperature-controlling sleeve. In this way, a gas temperature-controlling ring with an enlarged gas-guiding surface is easily created, along which the gas is guided for the purpose of temperature control.

A further preferred exemplary embodiment of the method is characterized in that the reshaped sheet metal material is bent around the sleeve-like base body and connected thereto in order to realize the gas temperature-controlling ring. The connection to the sleeve-like base body is advantageously created by a material lock. The material lock can be established, for example, by soldering or welding.

The invention further relates to a gas temperature-controlling ring, in particular a sleeve-like base body and/or a structural sheet or a structural sheet metal sleeve, for a gas supply apparatus as described above.

The invention also relates, as needed, to a fuel cell system with a gas supply apparatus as described above. The gas supply apparatus, preferably configured as an air supply apparatus, serves in the fuel cell system to compress air supplied to a fuel cell stack in the fuel cell system.

Further advantages, features, and details of the invention arise from the following description, in which exemplary embodiments are described in detail with reference to the drawings.

BRIEF DESCRIPTION OF THE DRAWINGS

The following are shown.

DETAILED DESCRIPTION

Figure 1:
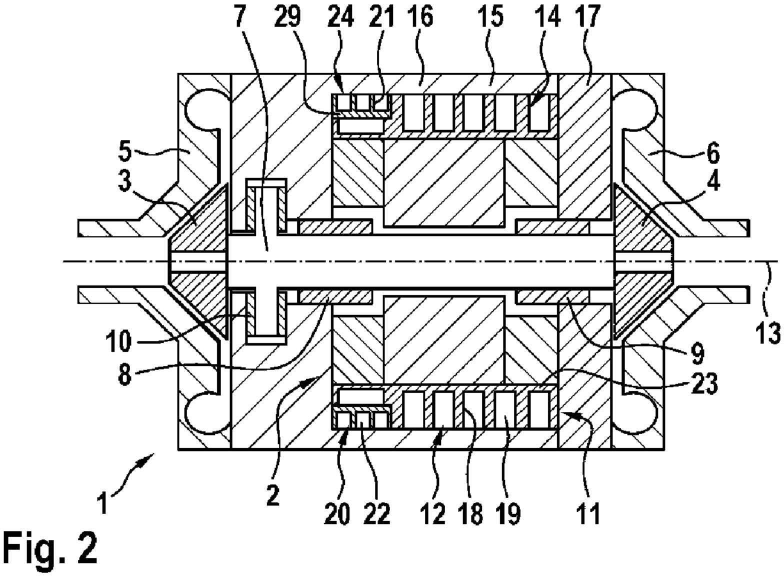
FIG. 1: a schematic illustration of an air supply apparatus configured as a compressor, with a cooling device consisting of a coolant cooling combined with an air cooling according to a first exemplary embodiment in a longitudinal sectional view.

In FIG. 1, a gas supply apparatus 1 configured as an air supply apparatus is shown schematically in a longitudinal sectional view. The air supply apparatus 1 is configured as a compressor with two impellers 3, 4.

The impellers 3, 4 are configured as compressor wheels and are each arranged in a rotatable manner in a spiral housing 5, 6. The impellers 3, 4 are rotatably driven by an electromotive drive 2. The electromotive drive 2 comprises a stator in which a rotor with a shaft 7 is rotatably driven.

The shaft 7 is rotatably mounted in a housing 15 with the aid of two radial bearings 8, 9 and one axial bearing 10. The housing 15 comprises a housing body 16, which is designed in a substantially bowl-like manner. The bowl-like housing body 16 is closed by a housing lid 17. The housing 15, along with the housing body 16 and the housing lid 17, is arranged in the axial direction between the two spiral housings 5, 6, which also constitute parts of the housing 15.

The term "axial" refers to a rotational axis 13 about which the shaft 7 with the two impellers 3, 4 is rotatably mounted in the housing 15. "Axial" means in the direction of, or parallel to, this rotational axis 13. "Analog" means radially transverse to the rotational axis 13.

The electromotive drive 2, in particular the stator of the electromotive drive 2, is surrounded in the housing 15 by a temperature-controlling device 11 configured as a cooling device. The cooling device 11 is arranged in an annular space, which is radially inwardly delimited by the electromotive drive 2, in particular by the stator of the electromotive drive 2.

The annular space in which the cooling device 11 is arranged radially outwardly is delimited by the housing body 16. In the axial direction, the annular space in which the cooling device 11 is arranged is delimited by the housing body 16 and the housing lid 17.

The cooling device 11 comprises a medium temperature control 12 configured as a coolant cooling and a gas temperature control configured as an air cooling 20. The coolant cooling 12 is operated with a preferably liquid temperature-controlling medium, preferably a coolant, for example a water-glycol mixture. In the operation of the coolant cooling 12, the temperature-controlled, preferably cooled, coolant flows through a first radially outwardly opening temperature-controlling guide geometry 18.

The first radially outwardly opening temperature-controlling guide geometry 18 comprises a plurality of temperature-controlling medium channels 19, in particular coolant channels, which are configured on a temperature-controlling sleeve 14, also referred to as the motor-cooling sleeve. The radially outwardly opening temperature-controlling guide geometry 18 of the coolant cooling 12 is largely delimited by the housing body 16 and, to a smaller extent, by the air cooling 20.

The air cooling 20 comprises a second temperature-controlling guide geometry 21, which also opens radially outwardly, with a plurality of gas channels 22, in particular air channels, that are delimited by gas-guiding structures. The radially outwardly opening temperature-controlling guide geometry 21 of the air cooling 20 is delimited radially outwardly by the housing body 16.

Figure 2:
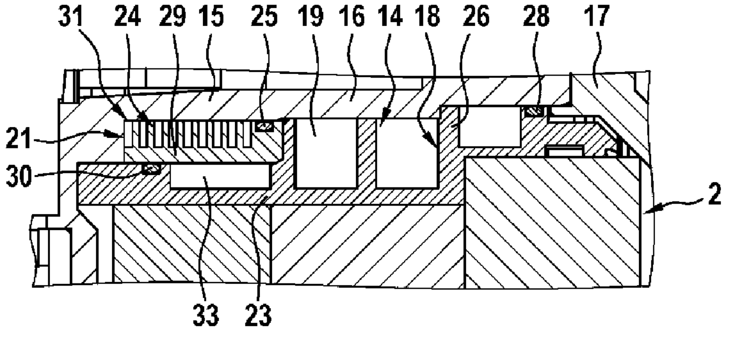
FIG. 2: an excerpt from FIG. 1 according to a slightly modified variant of the exemplary embodiment shown in FIG. 1.

In FIG. 2, it can be seen that the temperature-controlling guide geometry 18 of the coolant cooling 12 is radially inwardly delimited by a sleeve-like base body 23 of the motor-cooling sleeve 14. Analogously, the temperature-controlling guide geometry 21 of the air cooling 20 is radially inwardly delimited by a sleeve-like base body 29 of a gas temperature-controlling ring 24. The sleeve-like base bodies 23, 29 each preferably have substantially the design of straight circular-cylindrical barrels.

The base body 23 of the motor-cooling sleeve 14 can comprise different axial sections in which the base body 23 has different inner diameters. With the different inner diameters, shoulders are realized, which serve to position the motor-cooling sleeve 14 in relation to the electromotive drive 2, for example. The outer diameters of the base body 23 of the motor-cooling sleeve 14 are also advantageously designed to have different sizes in these axial sections.

A sealing means 28, indicated by way of example, is configured as an O-ring and serves to provide a seal between the motor-cooling sleeve 14 and the housing body 16. Analogously, a sealing device 25, which is preferably also designed as an O-ring, serves to provide a seal between the gas temperature-controlling ring 24 and the housing body 16.

The cooling device 11 represents a heat exchanger composed of three components: an inner part, a central part, and an outer part. The inner part is the motor-cooling sleeve 14. The central part is the gas temperature-controlling ring 24. The outer part is the housing 15 with the housing body 16.

A temperature-controlling medium channel 33, in particular a coolant channel 33, is formed between the inner part 14 and the central part 24, through which a temperature-controlling medium, in particular a coolant, flows, for example a water-glycol mixture. Between the central part 14 and the outer part 16, there is at least one gas-guiding structure, for example an air channel, for the gas to be temperature-controlled, in particular cooled, for example air.

In FIG. 2, it can be seen that the gas temperature-controlling ring 24, which can also be referred to as the air cooling ring, comprises a plurality of gas-guiding structures, also referred to as air-guiding structures. The gas-guiding structures are realized with the aid of a structural sheet metal 50 on the gas temperature-controlling ring 24, as will be described below with reference to FIGS. 3 to 18, in order to serve as the second temperature-controlling guide geometry 21.

Radially outwardly between the second temperature-controlling guide geometry 21 and the housing body 16, indicated only by a reference numeral in FIG. 2, pressure compensation gaps 31 can be provided, which allow for a pressure compensation between individual gas channels that are delimited by the gas-guiding structures. A more even flow through the air channels or gas channels can thus be realized. To create a seal between the temperature-controlling sleeve 14, also referred to as the inner part, and the gas temperature-controlling ring 24, a sealing device 30, configured as an O-ring, is provided.

Figure 3:
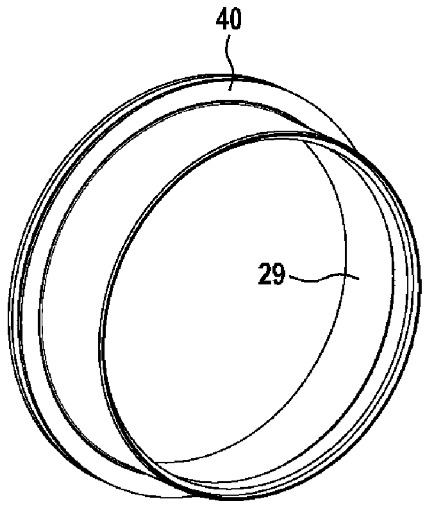
FIGS. 3 to 18: various exemplary embodiments in different views and representations of a gas temperature-controlling ring of the compressor shown in FIGS. 1 and 2 realized with the aid of a structural sheet metal.
Figure 7:
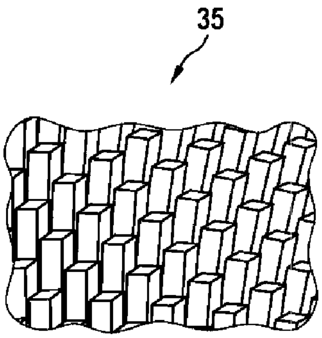
Figure 8:
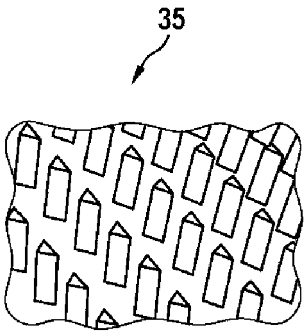
Figure 9:
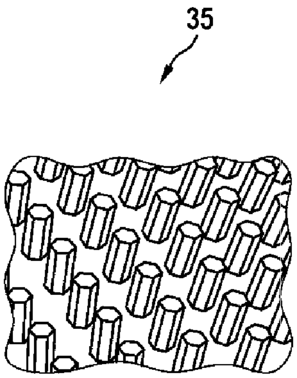
Figure 10:
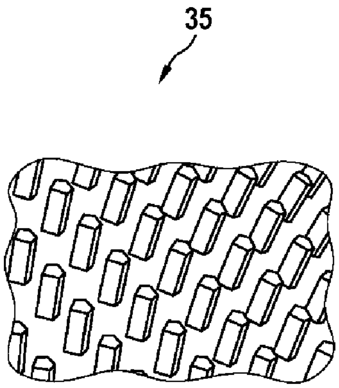
Figure 11:
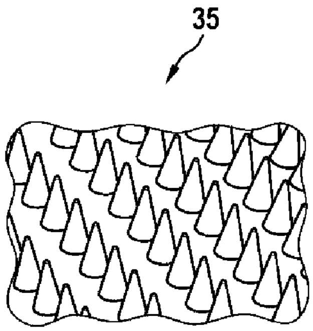
Figure 12:
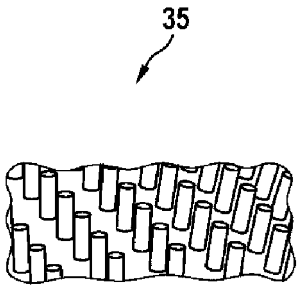
Figure 13:
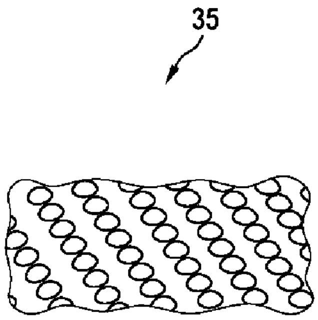
Figure 14:
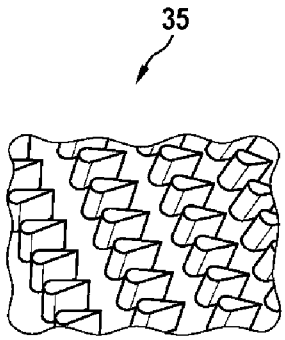

In FIG. 3, the sleeve-like base body 29 of the gas temperature-controlling ring 24 is shown only in a perspective view. The base body 29 has the design of a straight circular-cylindrical barrel. At one axial end, the base body 29 comprises a radially outwardly projecting collar 40. As can be seen in FIG. 7, the collar 40 is equipped with a receptacle groove 46 for receiving the sealing device 25 bearing the reference numeral 25 in FIG. 2.

The sleeve-like base body 29 can be combined with the structural sheet metal 50 as described below with reference to FIGS. 4 to 18. In FIGS. 7 to 14, a section of the structural sheet metal 50 in different embodiments is shown perspectively in an aerial view, respectively.

Figure 4:
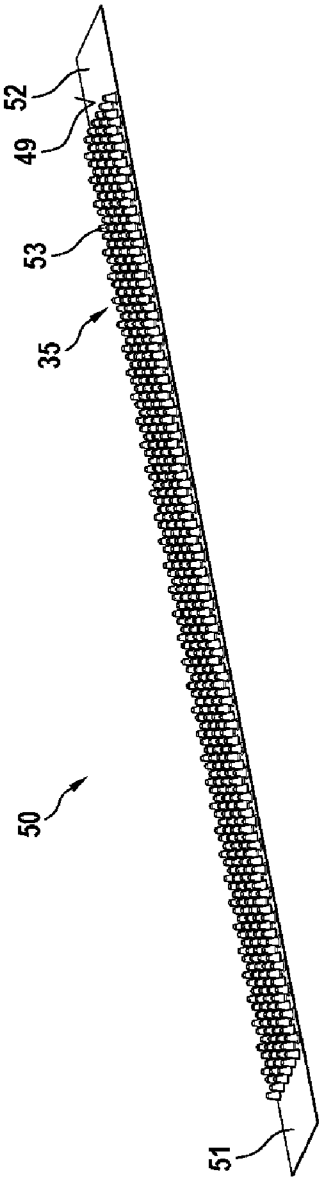
Figure 5:
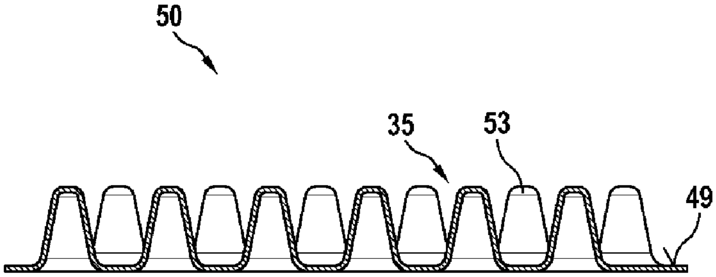
Figure 6:
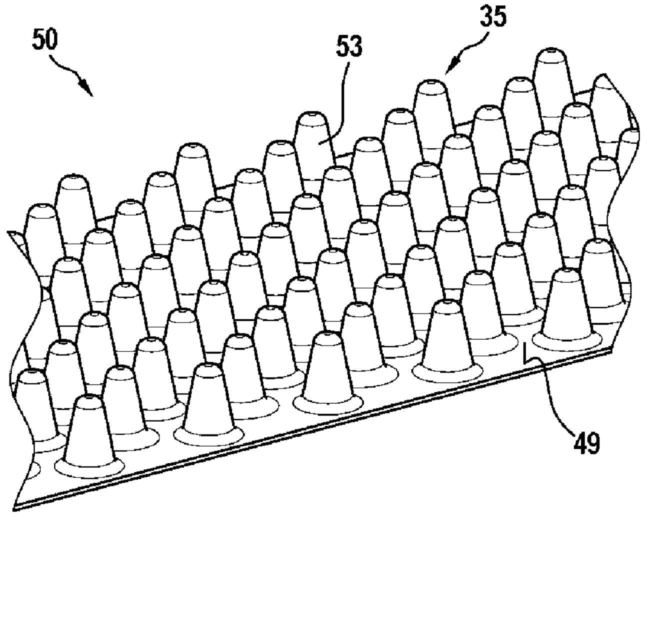

In FIGS. 4 to 6, an embodiment of the structural sheet metal 50 is shown in various views. The structural sheet metal 50 is formed from a metallic sheet metal material. The structural sheet metal 50 has the shape of an elongated rectangle with two planar end portions 51, 52. Between the end portions 51, 52, the structural sheet metal 50 comprises a gas-guiding surface 49.

The gas-guiding surface 49 is equipped with a plurality of raised regions 53. The raised regions 53 are formed by deep-drawing in the structural sheet metal 50. The raised regions 53 serve as gas-guiding elements 35 in the gas-guiding surface 49.

The gas-guiding surface 49 with the gas-guiding elements 35 serves as the aforementioned second radially outwardly opening temperature-controlling guide geometry 21 on the gas temperature-controlling ring, which bears the reference numeral 24 in FIGS. 1 and 2. The raised regions 53 have the shape of truncated cones that taper towards a closed end starting from the gas-guiding surface 49.

Figure 15:
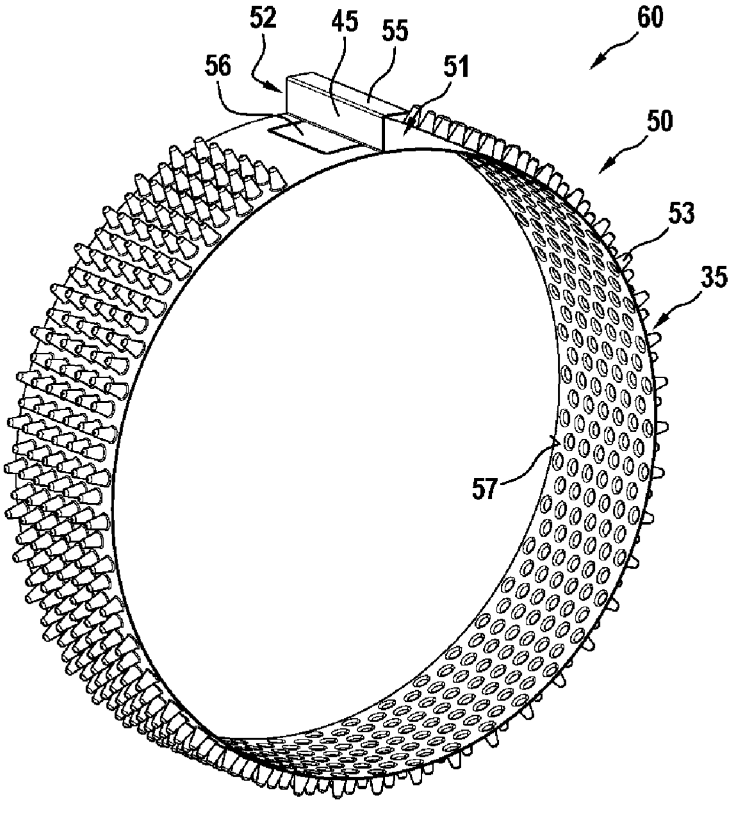

In FIG. 15, the structural sheet metal 50 is shown in a bent state. In its bent state, the structural sheet metal 50 serves as a structural sheet metal sleeve 60 with a connecting surface 57. With its two end portions 51, 52, the bent structural sheet metal 50 is positively and materially locked. For this purpose, a connection tab 56 is formed on the end portion 51 and is inserted through a corresponding slot in the end portion 52. Moreover, the connection tab 56 is connected to the end portion 52 in a material-locking manner.

Moreover, the end portion 52 comprises a step-like, angled collar 55, which represents a separator 45 on the structural sheet metal sleeve 60. The separator 45 radially separates an inflow recess 41 from an outflow recess 42 on the gas-guiding surface 49.

The inflow recess 41 and the outflow recess 42 are delimited by the collar 40 in the axial direction. Radially inwardly, the inflow recess 41 and the outflow recess 42 are delimited by the end portions 51 and 52. Radially outwardly, the inflow recess 41 and the outflow recess 42 are delimited by the housing body 16 in the installed state of the gas temperature-controlling ring 24.

Figure 16:
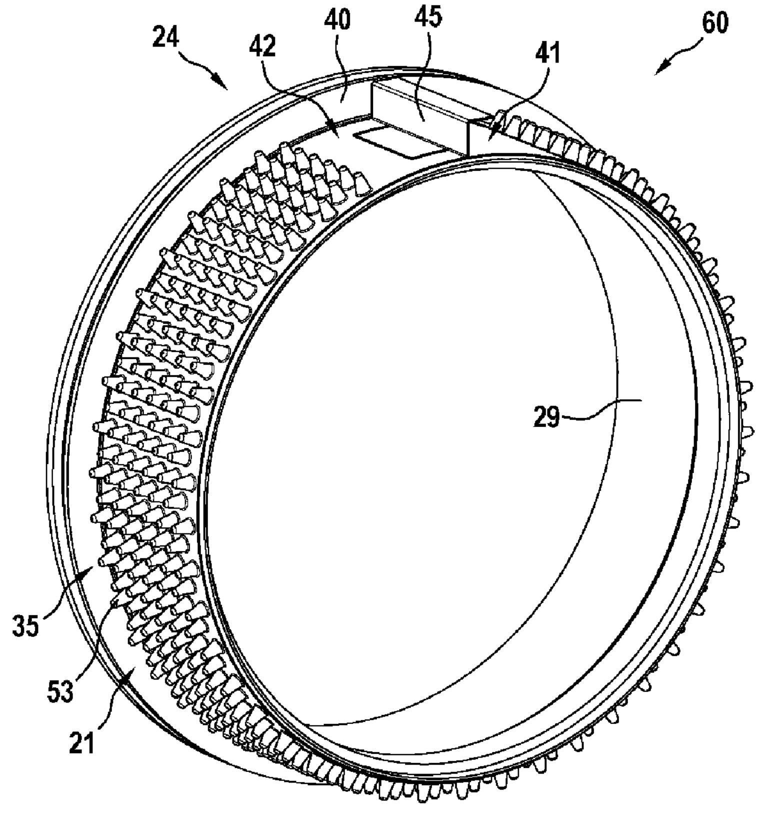

FIG. 16 shows how the structural sheet metal sleeve 60 is mounted on the sleeve-like base body 29. For the purpose of fastening, the structural sheet metal sleeve 60 is advantageously connected in a material-locking manner to the sleeve-like base body 29 on its connecting surface 57. The raised regions 53 serve as the radially outwardly opening temperature-controlling guide geometry 21 on the gas temperature-controlling ring 24.

Figure 17:
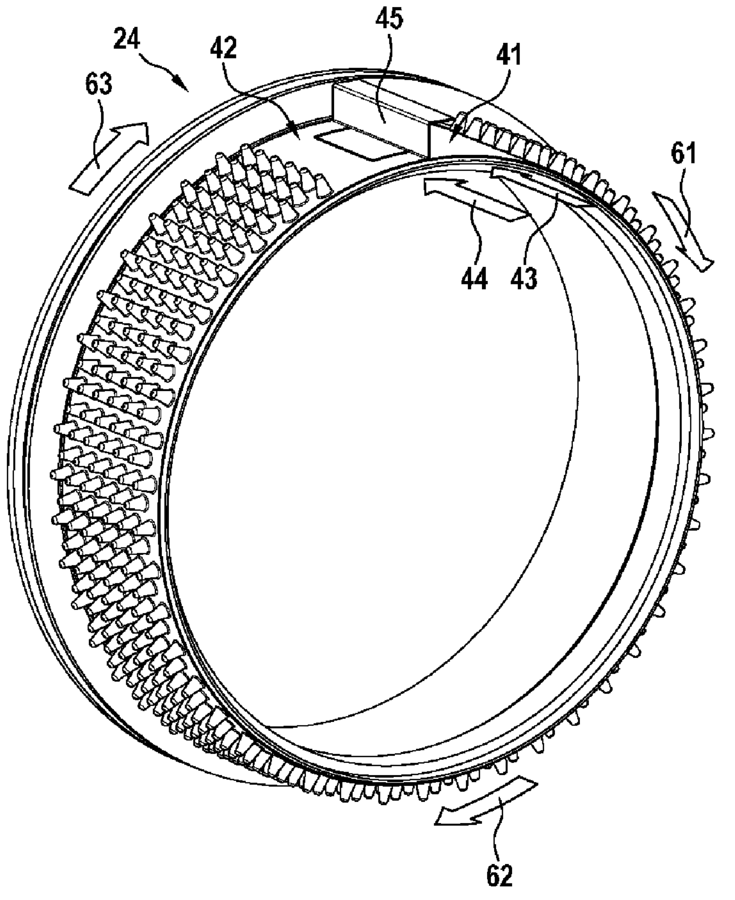

In FIG. 17, arrows 43 and 44 indicate how gas is fed axially at an inflow opening and discharged axially at an outflow opening. Arrows 61, 62 and 63 indicate how the supplied gas is guided in the circumferential direction along the second temperature-controlling guide geometry 21.

In FIG. 17, the gas temperature-controlling ring 24 has an almost complete wrapping of 360 degrees with the structural sheet metal 50 between the inflow recess 41 and the outflow recess 42. It is also possible that the inflow recess 41 and the outflow recess 42 are further spaced apart on the perimeter of the gas temperature-controlling ring 24. Then, the degree of wrapping decreases accordingly and can also be, for example, 270 degrees, 180 degrees, or 90 degrees of wrapping.

A further embodiment provides for the inflow recess 41 and the outflow recess 42 to be arranged diametrically. As a result, the flow is divided in the inlet region and flows from there in two directions along the perimeter of the structural sheet metal sleeve 60 to the outlet. This provides the advantage, among other things, that the separator or transverse bar can be omitted.

Figure 18:
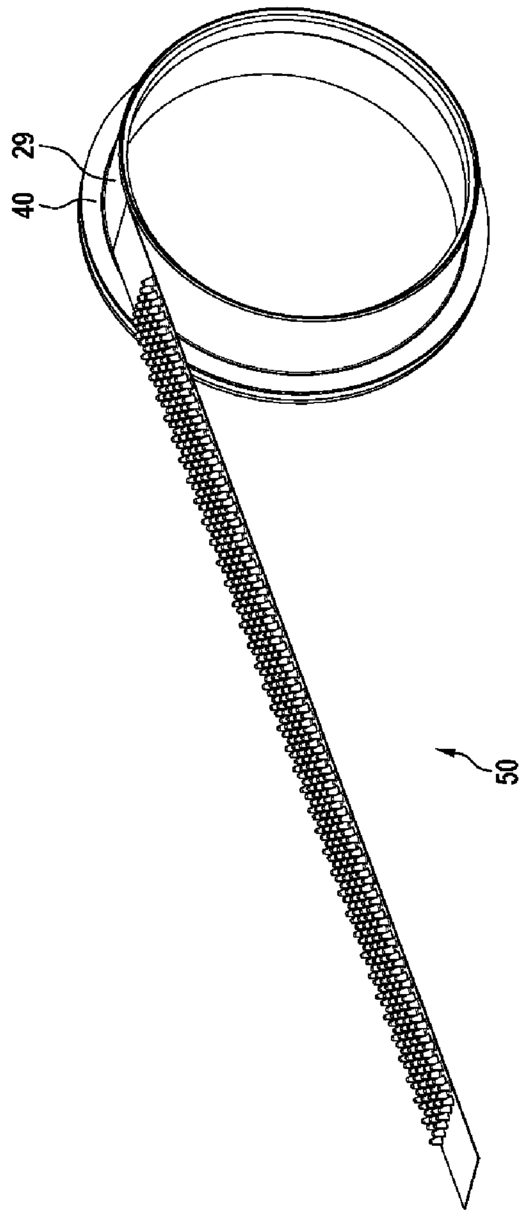

It is shown in FIG. 18 that the structural sheet metal 50 can also have two open ends. For the joining process, it is then bent around the sleeve-like base body 29 and thereafter connected at its ends by a material bond, for example by soldering or welding. The separator or transverse bar can already be located on the structural sheet metal 50. However, the separator or transverse bar can also consist of a separate component that is attached to the structural sheet metal 50, for example by brazing or welding.

The invention claimed is:

1. A gas supply apparatus comprising:

a shaft, which is rotatably mounted about a rotational axis;

a temperature-controlling device including a medium temperature control surrounding the shaft and combined with a gas temperature control; and a housing, wherein the housing is configured to surround the shaft and the temperature-controlling device wherein the temperature-controlling device comprises:

a temperature-controlling sleeve with a first temperature-controlling guide geometry, which opens radially outward and is configured for guiding a flow of a temperature-controlling medium, and, for temperature-controlling gas, a gas temperature-controlling ring, which includes a second temperature-controlling guide geometry that opens radially outward, said gas temperature-controlling ring delimiting the first temperature-controlling guide geometry inwardly and/or axially and being delimited radially outwardly by a housing body, wherein the gas temperature-controlling ring comprises a sleeve-like base body, which is combined with a structural sheet metal that serves as a second radially-outwardly opening temperature-controlling guide geometry, and the housing radially outwardly delimits the second temperature-controlling guide geometry of the gas temperature-controlling ring and at least partially delimits the first temperature-controlling guide geometry of the temperature-controlling sleeve.

2. The gas supply apparatus according to claim 1, wherein the sleeve-like base body is configured as a straight circular-cylindrical barrel.

3. The gas supply apparatus according to claim 1, wherein the sleeve-like base body comprises a collar at one end.

4. The gas supply apparatus according to claim 1, wherein the structural sheet metal is connected to the sleeve-like base body in a material-locking manner.

5. The gas supply apparatus according to claim 1, wherein the structural sheet metal is connected to the sleeve-like base body in a positive-locking manner.

6. The gas supply apparatus according to claim 1, wherein, on a side facing away from the sleeve-like base body, the structural sheet metal comprises a gas-guiding surface with raised regions, which serve as the second radially-outwardly opening temperature-controlling guide geometry.

7. A method for manufacturing a temperature-controlling device for a gas supply apparatus according to claim 6, wherein a sheet metal material is reshaped to form the gas-guiding surface with the raised regions, which serve as the second radially-outwardly opening temperature-controlling guide geometry.

8. The method according to claim 7, wherein the reshaped sheet metal material is bent and merged at two ends to create a structural sheet metal sleeve that is connected to the sleeve-like base body to realize the gas temperature-controlling ring, which is mounted on the temperature-controlling sleeve.

9. The method according to claim 7, wherein the reshaped sheet metal material is bent around the sleeve-like base body and connected thereto to define the gas temperature-controlling ring.

10. A gas supply system comprising:

a shaft rotatably mounted about a rotational axis in a housing; and a temperature-controlling device including a medium temperature control surrounding the shaft and combined with a gas temperature control, wherein the gas temperature control comprises a gas temperature-controlling ring comprising:

a sleeve-like base body configured as a straight circular barrel;

a collar at one axial end of the base body, wherein the collar has a receptacle groove for receiving a sealing element;

a structural sheet metal configured as a second radially-outwardly opening temperature-controlling guide geometry; and a separator configured to connect end portions of the structural sheet metal, wherein the separator separates an inflow recess from an outflow recess.

* * * * *